(12) United States Patent
Lagarde et al.

(10) Patent No.: US 9,897,212 B2
(45) Date of Patent: Feb. 20, 2018

(54) SEAL ASSEMBLY FOR A TURBINE ENGINE COMPRISING MEANS FOR LUBRICATING A BRUSH SEAL

(71) Applicant: Snecma, Paris (FR)

(72) Inventors: Romain Lagarde, la Queue en Brie (FR); Jean François Comin, Melun (FR); René Serge Morreale, Guignes (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 14/889,896

(22) PCT Filed: May 12, 2014

(86) PCT No.: PCT/FR2014/051087
§ 371 (c)(1),
(2) Date: Nov. 9, 2015

(87) PCT Pub. No.: WO2014/184477
PCT Pub. Date: Nov. 20, 2014

(65) Prior Publication Data
US 2016/0116068 A1     Apr. 28, 2016

(30) Foreign Application Priority Data
May 13, 2013   (FR) ...................... 13 54266

(51) Int. Cl.
*F16J 15/3288*   (2016.01)
*F01D 11/00*     (2006.01)
(Continued)

(52) U.S. Cl.
CPC .......... *F16J 15/3288* (2013.01); *F01D 11/00* (2013.01); *F01D 11/003* (2013.01); *F02C 7/28* (2013.01);
(Continued)

(58) Field of Classification Search
CPC ...... F16J 15/162; F16J 15/324; F16J 15/3288; F01D 25/183; F05D 2240/56; F02C 7/28
(Continued)

(56) References Cited

U.S. PATENT DOCUMENTS 4,781,388 A   11/1988   Wohrl
5,480,162 A   1/1996    Beeman, Jr.
(Continued)

FOREIGN PATENT DOCUMENTS

| EP | 1 203 905 A2 | 5/2002 | |
|----|--------------|--------|--|
| FR | 2997470      | * 10/2012 | ............ F01D 11/001 |
| WO | 2011/117542 A1 | 9/2011 | |

OTHER PUBLICATIONS

Search Report issued in French Patent Application No. FR 13 54266 dated Feb. 20, 2014.
(Continued)

*Primary Examiner* — Nicholas L Foster
(74) *Attorney, Agent, or Firm* — Pearne & Gordon LLP

(57) ABSTRACT

An assembly forming a seal for a turbine engine, comprising a brush seal formed by a plurality of sealing bristles surrounding a core, a retaining cap comprising a portion at least partially housing the brush seal, and a support cover placed in contact with the brush seal in order to hold it in position against the retaining cap, the brush seal being situated between the retaining cap and the support cover. The support cover comprises a structure for lubricating the bristles of the brush seal, comprising an opening for collecting lubricating oil, a lubricating oil distribution groove connected to the opening, and at least one channel for flow of lubricating oil towards the bristles of the brush seal, connected to the groove.

11 Claims, 4 Drawing Sheets

(51) Int. Cl.
*F02C 7/28* (2006.01)
*F16J 15/328* (2016.01)

(52) U.S. Cl.
CPC ....... *F16J 15/328* (2013.01); *F05D 2220/323* (2013.01); *F05D 2240/56* (2013.01)

(58) Field of Classification Search
USPC .......................................................... 277/355
See application file for complete search history.

(56) References Cited

U.S. PATENT DOCUMENTS

| | | | |
|---|---|---|---|
| 6,170,831 B1 | 1/2001 | Bouchard | |
| 6,609,888 B1 | 8/2003 | Ingistov | |
| 6,695,314 B1* | 2/2004 | Gail | F01D 11/001 |
| | | | 277/355 |
| 2003/0019692 A1* | 1/2003 | Downes | F16J 15/3252 |
| | | | 184/105.3 |
| 2007/0290448 A1* | 12/2007 | Roeingh | B21B 31/078 |
| | | | 277/349 |
| 2008/0011115 A1* | 1/2008 | Wakabayashi | F16H 57/0434 |
| | | | 74/467 |
| 2008/0035428 A1* | 2/2008 | Omoto | F16H 57/0427 |
| | | | 184/6 |
| 2009/0199534 A1 | 8/2009 | Bart | |
| 2013/0015018 A1* | 1/2013 | Gauthier | F01D 11/001 |
| | | | 184/6.11 |
| 2015/0097342 A1 | 4/2015 | Morreale | |
| 2015/0300191 A1 | 10/2015 | Morreale | |

OTHER PUBLICATIONS

International Search Report issued in Application No. PCT/FR2014/051087 dated Jul. 21, 2014.
Written Opinion issued in Application No. PCT/FR2014/051087 dated Jul. 21, 2014.

* cited by examiner

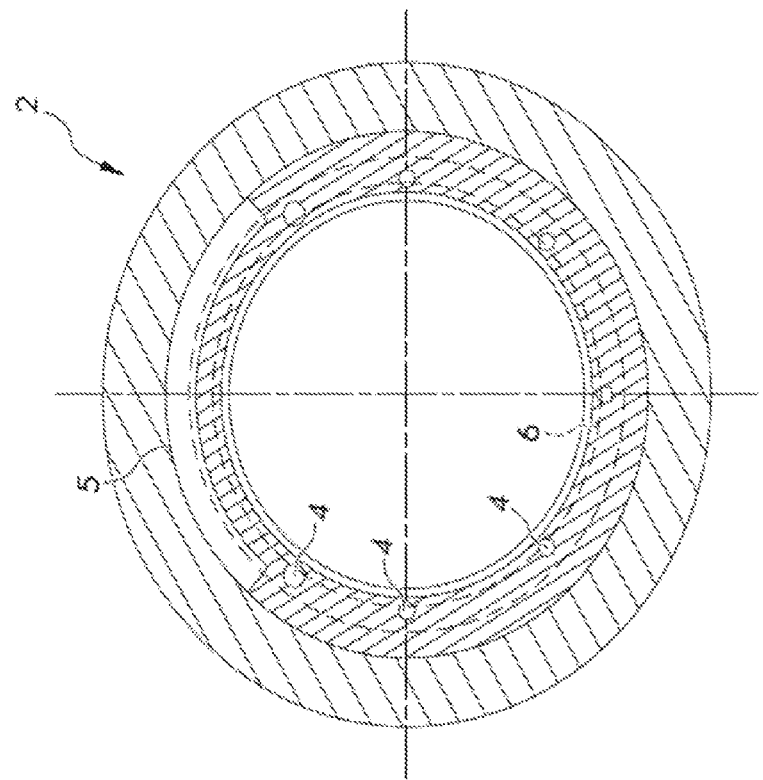
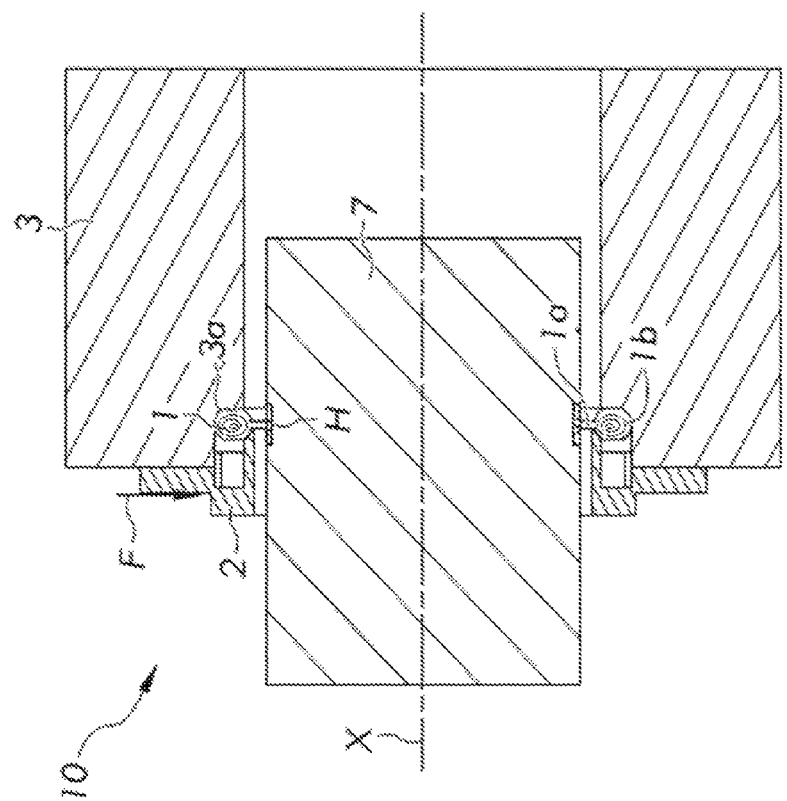
FIG. 1A
FIG. 1B

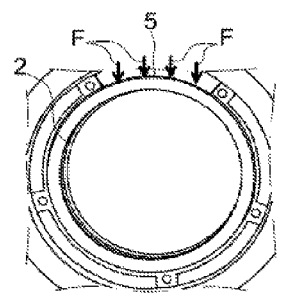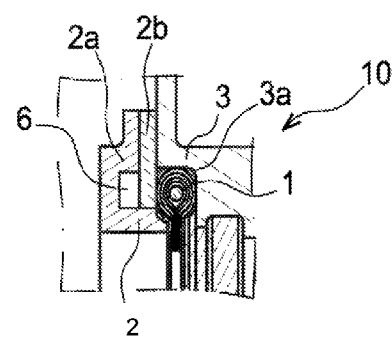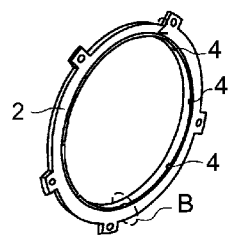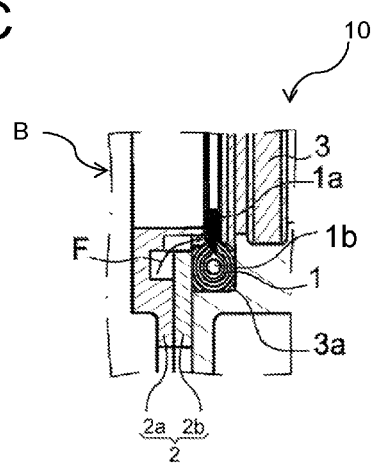

SEAL ASSEMBLY FOR A TURBINE ENGINE COMPRISING MEANS FOR LUBRICATING A BRUSH SEAL

TECHNICAL FIELD

The present invention relates to the field of turbine engines, and more particularly to the general field of sealing systems intended to provide a seal between two chambers of a turbine engine, comprising in particular brush seals.

The invention applies to any type of terrestrial or aeronautical turbine engine, and in particular to aircraft turbine engines such as turbojet engines and turboprop engines. More preferentially, the invention applies to a dual-body bypass turbojet engine.

The invention thus relates more specifically to an assembly forming a seal for a turbine engine comprising a brush seal and the associated turbine engine, as well as a method for manufacturing such an assembly.

PRIOR ART

In the field of turbine engines, there exist various types of sealing system for providing a seal between two parts of the turbine engine.

There are in particular "permanent contact" sealing systems and "contactless" sealing systems. "Permanent contact" sealing systems include for example brush seals and segmented radial seals and are characterised by having, in normal operation, permanent contact between two parts of the turbine engine. "Contactless" sealing systems comprise for example labyrinth seals and are characterised by an absence of contact between the parts of the turbine engine, except where applicable during particular events such as high imbalance levels and severe manoeuvres of the turbine engine.

Brush seals are for example known from the patents U.S. Pat. No. 4,781,388, U.S. Pat. No. 5,480,162 and U.S. Pat. No. 6,170,831. They consist of a plurality of bristles or fibres, for example made from carbon, or even metal or Kevlar®, which are crimped or welded and held in a housing at one of their ends and are in contact, at their free ends, with the surface of the part to be sealed of the turbine engine. Such brush seals may make it possible to adapt to variations in clearance undergone by the sealing devices. This is because the bristles of a brush seal may by design adapt to the deformed or discontinuous surfaces of the part to be sealed.

The contact of the bristles of the brush seal with the surface of the part to be sealed of the turbine engine, for example a rotating shaft, makes it possible to fulfil the sealing function of the brush seal. However, this contact gives rise to rubbing of the bristles on this surface, which generally involves premature wear on the bristles. The bristles thus worn can then no longer provide a seal for the brush seal, so that its efficacy becomes very much reduced, or even zero.

DISCLOSURE OF THE INVENTION

There consequently exists a need for improving the efficacy of brush seals providing a seal between two parts of a turbine engine.

There exists in particular a need for reducing or even preventing wear on the bristles of such brushes.

The aim of the invention is to at least partially remedy the requirements mentioned above and the drawbacks relating to the embodiments of the prior art.

The subject matter of the invention, according to one of its aspects, is thus an assembly forming a seal for a turbine engine, comprising:
- a brush seal formed by a plurality of sealing bristles surrounding a core,
- a retaining cap comprising a portion at least partially housing a brush seal, and
- a support cover, placed in contact with the brush seal in order to hold it in position against the retaining cap, the brush seal being situated between the retaining cap and the support cover, characterised in that the support cover comprises means for lubricating the bristles of the brush seal, comprising an opening for collecting lubrication oil, a groove for distributing lubricating oil connected to said opening, and at least one channel for flow of the lubricating oil towards the bristles of the brush seal, connected to said groove.

By virtue of the invention, it is possible to carry out lubrication (or "wetting") of the bristles of the brush seals thus limiting or even preventing wear on the bristles and guaranteeing for as long as possible the sealing function of the brush seals. The invention can therefore prolong the service life of brush seals used in turbine engines.

The assembly forming a seal according to the invention may further comprise one or more of the following features taken in isolation or in accordance with all possible technical combinations.

The brush seal may provide a seal for any part to be sealed of the turbine engine, in particular that of a rotating shaft.

The assembly forming a seal according to the invention may be situated between two chambers of the turbine engine between which a seal is required, and the lubricating oil may advantageously come from the oil situated in at least one of the two chambers of the turbine engine between which the assembly forming a seal is situated.

The groove distributing lubricating oil may extend over the entire periphery of the support cover. In particular, the groove may extend over 360° about the rotation axis of a rotating shaft with which the bristles of the brush seal are in contact.

The support cover may comprise a plurality of channels for flow of the lubricating oil towards the bristles of the brush seal, having variable cross sections and/or a variable angular distribution on the periphery of the support cover, determined in particular so that all the channels provide lubrication of the bristles of the brush seal with the same flow of lubricating oil.

In this way, it is possible to have homogeneous lubrication of the brush seal. The characteristics of the channels, in particular their sizing and distribution, can thus be determined so that they constitute points for supply of lubricating oil to the bristles of the brush seal with a uniform flow rate of oil.

Moreover, when the turbine engine is functioning, oil being able to be permanently contained in at least one of the two chambers between which the assembly forming the seal according to the invention is situated, lubrication of the brush seal can be ensured continuously.

The flow channels are advantageously sized so that the total flow rate of lubricating oil emerging through the channels is equal to the total flow rate of lubricating oil entering through the oil-collection opening in the support cover, so that the cover does not empty more quickly than it fills (in which case the oil could not emerge from the highest channels), or vice versa (in which case the oil would overflow through the collection opening).

The lubricating oil collection opening of the support cover may extend over at least a quarter of the periphery of the support cover.

The lubricating oil distribution groove may be formed radially on the periphery of the support cover, in particular by machining, and enclosed by means of the retaining cap to allow flow of lubricating oil inside it.

In a variant, the support cover may be formed by the assembly of a first part and a second part. The lubricating oil distribution groove may then be formed, in particular by machining, on one of the first and second parts and enclosed by the other one of the first part and second parts to enable lubricating oil to flow inside it.

In a variant again, the assembly forming a seal according to the invention may comprise an annular closure segment situated between the brush seal and the support cover. The lubricating oil distribution groove may then be formed, in particular by machining, on the support cover and enclosed by means of the closure segment to enable lubricating oil to flow inside it.

Another subject matter of the invention, according to another of its aspects, is a turbine engine characterised in that it comprises an assembly forming a seal as defined above.

Moreover, another subject matter of the invention, according to another of its aspects, is a method for manufacturing an assembly forming a seal as defined above.

In the method according to the invention a plurality of channels for flow of lubricating oil towards the bristles of the brush seal may be formed, in particular by piercing, on the support cover. The cross sections and/or the distribution of the channels on the periphery of the support cover may be determined so that all the channels provide lubrication of the bristles of the brush seal with the same flow rate of lubricating oil to allow homogeneous lubrication of the brush seal.

The turbine engine and the manufacturing method according to the invention may comprise any of the previously stated features, taken in isolation or in accordance with all technically possible combinations with other features.

BRIEF DESCRIPTION OF THE DRAWINGS

The invention may be better understood from a reading of the following detailed description of non-limitative example embodiments thereof, as well as an examination of the schematic and partial figures of the accompanying drawing, in which:

FIG. 1A illustrates, in axial section, an assembly forming a seal according to the invention, FIG. 1B illustrates, in radial section, the support cover of the assembly forming a seal of FIG. 1A, FIGS. 2A to 2D depict various views, in perspective and cross-section, of a first example embodiment of an assembly forming a seal according to the invention, FIGS. 3A to 3E depict various views, in perspective and cross-section, of a second example embodiment of an assembly forming a seal according to the invention.

In all these figures, identical references may designate identical or similar elements.

Figure 2A:
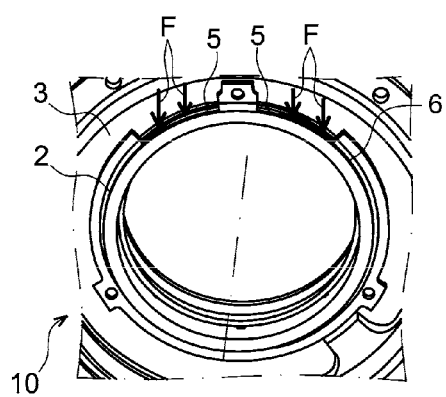

In addition, the various parts depicted in the figures are not necessarily shown to a uniform scale, in order to make the figures more legible.

DETAILED DISCLOSURE OF PARTICULAR EMBODIMENTS

With reference to FIG. 1A, this shows, in axial section, an assembly forming a seal 10 for a turbine engine according to the invention.

The assembly forming a seal 10 comprises a brush seal 1 formed by a plurality of bristles 1a, for example made from carbon, disposed around a core 1b. The brush seal 1 thus provides a seal between two chambers of the turbine engine, at least one of which comprises oil intended to serve as a lubricating oil for the assembly forming the seal 10.

The bristles 1a of the brush seal 1 come into contact with a rotating shaft 7 on a rotation axis X, which causes permanent rubbing of the bristles 1a on the rotating shaft 7 and causes premature wear to the bristles 1a of the brush seal 1, reducing the sealing capacities of the brush seal 1.

The assembly forming the seal 10 further comprises a retaining cap 3 provided with a portion 3a for at least partially housing the brush seal 1, as shown in FIG. 1. The portion 3a may correspond to a relief, in particular a hollow, on the retaining cap 3.

In addition, the assembly forming the seal 10 comprises a support cover 2 that is placed in contact with the brush seal 1 in order to hold it in position against the retaining cap 3, the brush seal 1 being situated between the retaining cap 3 and the support cover 2. More specifically, the support cover 2 compresses and holds the brush seal 1 in position against the retaining cap 3.

In order to reduce or even prevent wear on the bristles 1a of the brush seal 1 due to the rubbing on the rotating shaft 7, the support cover 2 comprises, in accordance with the invention, means for lubricating the bristles 1a of the brush seal 1.

These lubrication means lubricate the bristles 1a of the brush seal 1 by recovering the oil sprayed inside at least one of the chambers and entering the assembly forming the seal 10 in the direction of the arrow F, as shown in FIG. 1, so as to form a film of oil H at the bristles 1a of the brush seal 1.

In particular, the lubrication means comprise an opening 5 for collecting lubricating oil, a groove 6 for distributing lubricating oil connected to the opening 5, that is to say in fluid communication with the opening 5, and a plurality of channels 4 for flow of the lubricating oil towards the bristles 1a of the brush seal 1, all connected to the groove 6, that is to say all in fluid communication with the groove 6.

FIG. 1B shows, in radial section, the support cover 2 of the assembly forming the seal 10 of FIG. 1.

As can be seen, the collection opening 5 is produced on the top part of the support cover 2, for example over a quarter of the periphery of the support cover 2. In addition, the lubricating oil distribution groove 6 is for example produced over the entire periphery of the support cover 2, that is to say over an angle of 360° about the rotation axis X of the rotating shaft 7. A series of several channels 4 for flow of lubricating oil towards the bristles 1a of the brush seal 1 are also produced on the periphery of the support cover 2.

The channels 4 may for example be produced by piercing of the support cover 2. Their sizing, in particular their diameter (or cross section), as well as their distribution on the periphery of the support cover 2, can be determined so that the flow rate of lubricating oil emerging from each channel 4 towards the bristles 1a of the brush seal 1 is identical, that is to say so that the distribution groove 6 makes it possible to supply each channel 4 so that the channels 4 provide homogeneous lubrication over the whole of the brush seal 1. Thus the angular distribution of the channels 4 may be regular, or usually variable, over the periphery of the support cover 2. Likewise, the cross sections or diameters of the channels 4 may be identical, or usually different.

By means of the assembly forming the seal 10 according to the invention, the oil that runs in a chamber of the turbine engine close to the assembly forming the seal 10 can be captured in the direction of the arrow F by the collection opening 5 situated on the support cover 2. Then the lubricating oil fills the distribution groove 6, which itself distributes oil in the various channels 4 so as to form a film of oil H on the bristles 1a of the brush seal 1, which is then lubricated homogeneously.

Furthermore, since the oil runs permanently in the chamber when the turbine engine is in operation, lubrication of the brush seal 1 can be provided continuously.

Figure 2B:
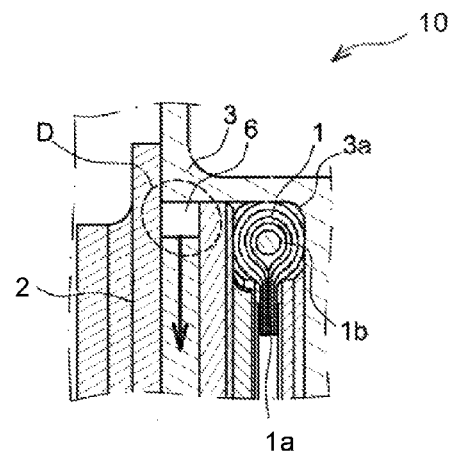
Figure 2C:
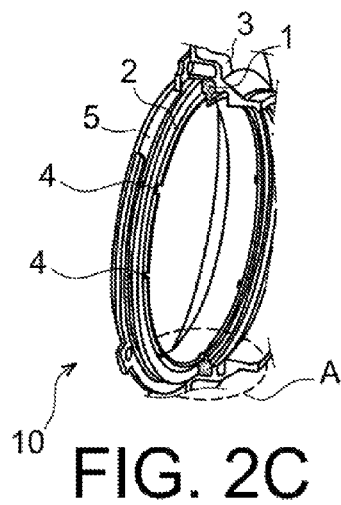
Figure 2D:
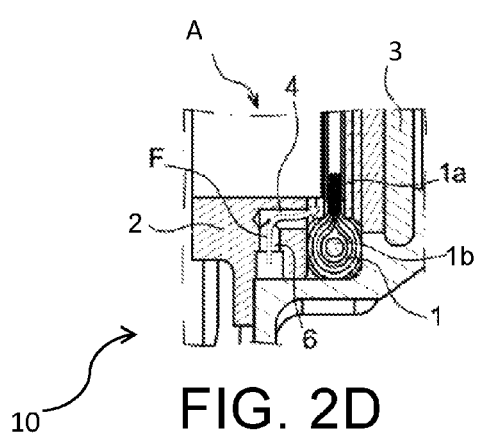

FIGS. 2A to 2D depict, in perspective in FIGS. 2A and 2C and in axial section in FIGS. 2B and 2D, a first example embodiment of an assembly forming a seal 10 according to the invention. FIG. 2D depicts an enlargement of zone A in FIG. 2C.

In this example, the lubricating oil distribution groove 6 is formed radially on the periphery of the support cover 2, as can be seen for example in FIGS. 2A and 2C, for example by machining, and enclosed by means of the retaining cap 3 to enable lubricating oil to flow inside the groove 6.

The zone D depicted in FIG. 2B makes it possible in particular to view the particularity of embodiment of this first example of an assembly forming a seal 10 according to the invention. As can be seen, the groove 6, extending over 360° about the axis A of the rotating shaft 7, is enclosed by assembling the retaining cap 3 on the support cover 2. The closure thus obtained by the retaining cap 3 in contact with the support cover 2 makes it possible to fill the groove 6 with oil.

In FIG. 2C, the design can be seen of the channels 4 for flow of lubricating oil towards the bristles 1a of the brush seal 1 on the periphery of the support cover 2, in particular by piercings of different diameters, the channels 4 being distributed so as to wet the brush seal 1 with a flow of oil that is as homogeneous as possible.

In FIG. 2D, the flow of lubricating oil from the groove 6 to the channels 4 and the bristles 1a of the brush seal 1 can be seen.

FIGS. 3A to 3E depict, in front view in the case of FIG. 3A, in perspective in the case of FIGS. 3B and 3D and in axial section in the case of FIGS. 3C to 3E, a second example embodiment of an assembly forming a seal 10 according to the invention. FIG. 3E depicts an enlargement of zone B in FIG. 3D.

In this example, the support cover 2 is formed by assembling a first part 2a and a second part 2b, as can be seen in particular in FIG. 3B.

The lubricating oil distribution groove 6 is formed, for example by machining, on the first part 2a and enclosed by the second part 2b to enable lubricating oil to flow inside the groove 6.

The two parts 2a and 2b are assembled together axially, that is to say the second part 2b encloses the first part 2a of the support cover 2 on the rotation axis X of the rotating shaft 7.

In the first and second examples above, described respectively with reference to FIGS. 2A to 2D and 3A to 3E, the use respectively of a bore in the retaining cap 3 for closing the distribution groove 6 or breaking down the support cover 2 into a first part 2a and a second part 2b can make it possible to integrate means for lubricating the bristles 1a of the brush seal 1 in a reduced space requirement for the assembly forming the seal 10.

Figure 4A:
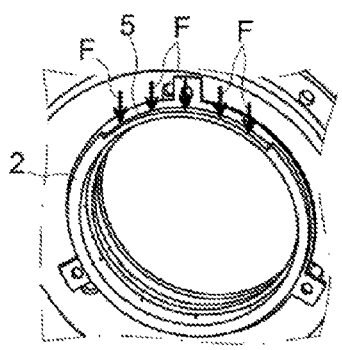
FIGS. 4A to 4D depict various views, in perspective and cross-section, of a third example embodiment of an assembly forming a seal according to the invention.
Figure 4B:
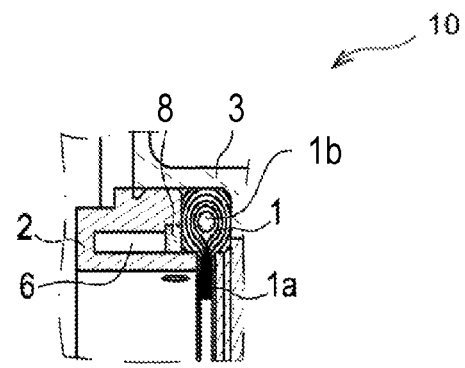
Figure 4C:
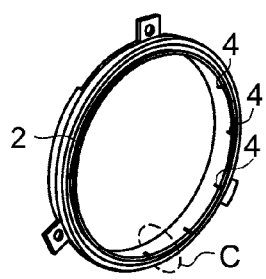
Figure 4D:
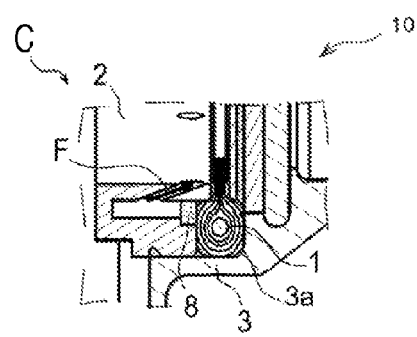

With reference to FIGS. 4A to 4D, these show, in perspective in the case of FIGS. 4A and 4C and an axial section in the case of FIGS. 4B and 4D, a third example embodiment of an assembly forming a seal 10 according to the invention. FIG. 4D shows an enlargement of zone C in FIG. 4D.

In this example, the assembly forming the seal 10 comprises an annular closure segment 8, visible in FIGS. 4B and 4D, situated between the brush seal 1 and the support cover 2. The lubricating oil distribution groove 6 is formed, for example by machining, on the support cover 2 and then enclosed by means of the closure segment 8 to enable lubricating oil to flow therein.

The closure segment 8, pressed against the support cover 2 and the brush seal 1, can thus ensure distribution, over 360° about the axis X of the rotating shaft 7, of lubricating oil intended to supply the channels 4.

Naturally the invention is not limited to the example embodiments that have just been described. Various modifications can be made thereto by a person skilled in the art.

The expression "comprising a" must be understood as being synonymous with "comprising at least one", unless the contrary is specified.

What is claimed is:

1. An assembly forming a seal for a turbine engine, comprising:
    a brush seal formed by a plurality of sealing bristles surrounding a core;
    a retaining cap comprising a relief housing at least a portion of the brush seal; and
    a support cover, placed in contact with the brush seal in order to hold it in position against the retaining cap, the brush seal being situated between the retaining cap and the support cover,
    wherein the support cover comprises a lubricating arrangement lubricating the bristles of the brush seal, the lubricating arrangement comprising an opening that collects lubricating oil and that continuously extends over at least a quarter of a periphery of the support cover, a groove that distributes the lubricating oil and that is connected to said opening, and a plurality of channels connected to said groove that directs flow of the lubricating oil towards the bristles of the brush seal,
    wherein the plurality of channels have at least one of a variable cross section or a variable angular distribution on the periphery of the support cover, such that all of the channels of the plurality of channels provide lubrication of the bristles of the brush seal with a same lubricating oil flow rate.

2. The assembly according to claim 1, wherein the groove extends over an entirety of the periphery of the support cover.

3. The assembly according to claim 1, wherein the groove for distributing the lubricating oil is formed radially on the periphery of the support cover, and enclosed by the retaining cap to allow flow of the lubricating oil therein.

4. The assembly according to of claim 1, wherein the support cover is formed by assembling a first part and a second part, the groove for distributing the lubricating oil being formed on one of the first part and second part and enclosed by the other one of the first part and second part to enable the lubricating oil to flow therein.

5. The assembly according to claim 1, wherein the assembly comprises an annular closure segment situated between the brush seal and the support cover, the groove for distributing the lubricating oil being formed on the support cover and enclosed by means of the closure segment to enable the lubricating oil to flow therein.

6. A turbine engine, comprising an assembly forming a seal according to claim 1.

7. A method for manufacturing an assembly forming a seal according to claim 1.

8. The assembly according to claim 1, wherein the relief comprises a hollow.

9. The assembly according to claim 1, wherein the support cover comprises a circular shape, wherein the opening continuously extends over a first quadrant of the support cover, wherein at least one channel of the plurality of the channels is located on a second quadrant the periphery of the support cover, and wherein the second quadrant is opposite the first quadrant.

10. The assembly according to claim 1, wherein the support cover comprises a circular shape, and wherein at least one channel of the plurality of channels is located in each quadrant of the circular shape of the support cover.

11. An assembly forming a seal for a turbine engine, comprising:
- a brush seal formed by a plurality of sealing bristles surrounding a core;
- a retaining cap comprising a relief housing at least a portion of the brush seal; and
- a support cover, placed in contact with the brush seal in order to hold it in position against the retaining cap, the brush seal being situated between the retaining cap and the support cover,
- wherein the support cover comprises a lubricating arrangement lubricating the bristles of the brush seal, the lubricating arrangement comprising an opening that collects lubricating oil and that continuously extends over at least a quarter of a periphery of the support cover, a groove that distributes the lubricating oil and that is connected to said opening, and a plurality of channels connected to said groove that directs flow of the lubricating oil towards the bristles of the brush seal,
- wherein the support cover comprises a circular shape, and
- wherein at least one channel of the plurality of channels is located in each quadrant of the circular shape of the support cover.

* * * * *